(12) United States Patent
Janardhanan

(10) Patent No.: US 9,225,670 B2
(45) Date of Patent: Dec. 29, 2015

(54) SYSTEM AND METHOD FOR STORAGE AND RETRIEVAL OF NEIGHBORING SWITCH TOKENS

(71) Applicant: Dell Products L.P., Round Rock, TX (US)

(72) Inventor: Pathangi Narasimhan Janardhanan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 13/781,232

(22) Filed: Feb. 28, 2013

(65) Prior Publication Data

US 2014/0241212 A1  Aug. 28, 2014

(51) Int. Cl.
*H04L 12/939* (2013.01)
*H04L 12/931* (2013.01)
*H04L 29/12* (2006.01)

(52) U.S. Cl.
CPC ............... *H04L 49/55* (2013.01); *H04L 49/35* (2013.01); *H04L 61/2015* (2013.01); *H04L 61/2038* (2013.01); *Y02B 60/43* (2013.01)

(58) Field of Classification Search
CPC .................................. H04L 49/35; H04L 49/55
See application file for complete search history.

(56) References Cited

U.S. PATENT DOCUMENTS

| | | | |
|---|---|---|---|
| 6,631,420 B1* | 10/2003 | Li et al. ........................ | 709/242 |
| 6,785,838 B2* | 8/2004 | Lim et al. .................... | 714/6.12 |
| 6,978,294 B1* | 12/2005 | Adams et al. ................ | 709/217 |
| 7,756,027 B1* | 7/2010 | Reddy et al. ................. | 370/230 |
| 8,893,271 B1* | 11/2014 | Sharma ......................... | 726/22 |
| 2002/0025810 A1* | 2/2002 | Takayama et al. ........... | 455/432 |
| 2002/0156888 A1* | 10/2002 | Lee et al. ..................... | 709/224 |
| 2007/0115807 A1* | 5/2007 | Rombeaut et al. ........... | 370/219 |
| 2012/0147884 A1* | 6/2012 | Yoon et al. ................... | 370/389 |

* cited by examiner

*Primary Examiner* — Chirag Shah
*Assistant Examiner* — Rina Pancholi
(74) *Attorney, Agent, or Firm* — Haynes and Boone, LLP

(57) ABSTRACT

A system and method for storage and retrieval of neighboring switch tokens includes a switch including one or more processors, memory storing a first token, and a first port configured to couple the switch to a second switch. The one or more processors are configured to send a first token storage request to the second switch, send a first token retrieval request to the second switch requesting the information associated with the first token, and receive a first retrieved token message from the second switch. The first token storage request includes information associated with the first token. The first retrieved token message includes first information associated with the first token.

20 Claims, 5 Drawing Sheets

SYSTEM AND METHOD FOR STORAGE AND RETRIEVAL OF NEIGHBORING SWITCH TOKENS

BACKGROUND

The present disclosure relates generally to information handling systems, and more particularly to storage and retrieval of neighboring switch tokens.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. And, as network switching products become larger and more complex, their potential for detecting network conditions and automating configuring and/or provisioning tasks increases.

Accordingly, it would be desirable to provide improved network switching products that can support automated configuration and provisioning. It would also be desirable to provide improved network switching product that can detect network conditions.

SUMMARY

According to one embodiment, a switch includes one or more processors, memory storing a first token, and a first port configured to couple the switch to a second switch. The one or more processors are configured to send a first token storage request to the second switch, send a first token retrieval request to the second switch requesting the information associated with the first token, and receive a first retrieved token message from the second switch. The first token storage request includes information associated with the first token. The first retrieved token message includes first information associated with the first token.

According to another embodiment, a switch includes one or more processors, memory, and a first port configured to couple the switch to a second switch. The one or more processors are configured to receive a first token storage request from the second switch, store the information associated with the first token in the memory, receive a first token retrieval request from the second switch requesting the information associated with the first token, and send a first retrieved token message to the second switch. The first token storage request includes information associated with a first token. The first retrieved token message includes the information associated with the first token.

According to yet another embodiment, a method of provisioning a switch includes checking memory of a first switch for a token, requesting a copy of the token from a second switch when the token is not found in the memory, sending a provisioning discover request including information associated with the switch identifier to a server when the token is found in the memory or when the second switch returns a copy of the token, sending a provisioning discover request including information associated with a hardware address of the first switch to the server when the token is not found in memory and the second switch does not return a copy of the token, receiving a provisioning offer from the server, and provisioning the first switch based on information associated with the provisioning offer. The token includes a switch identifier.

According to yet another embodiment, a method of detecting a reboot in a switch includes sending information associated with a token to the switch, requesting the sent information associated with the token from the switch, determining that the switch has rebooted when the switch does not return the sent information associated with the token, and determining that the switch has not rebooted when the switch returns the sent information associated with the token.

According to yet another embodiment, an information handling system includes a first switch including one or more first processors, a first memory storing a token, and a first port, a second switch including one or more second processors, a second memory, and a second port, and a network link coupling the first port to the second port. The one or more first processors are configured to send a token storage request to the second switch, send a token retrieval request to the second switch requesting the information associated with the token, and receive a retrieved token message from the second switch. The token storage request includes information associated with the token. The retrieved token message includes the information associated with the token. The one or more second processors are configured to receive the token storage request from the first switch, store the information associated with the token in the second memory, receive the token retrieval request from the first switch, and send the retrieved token message to the first switch.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
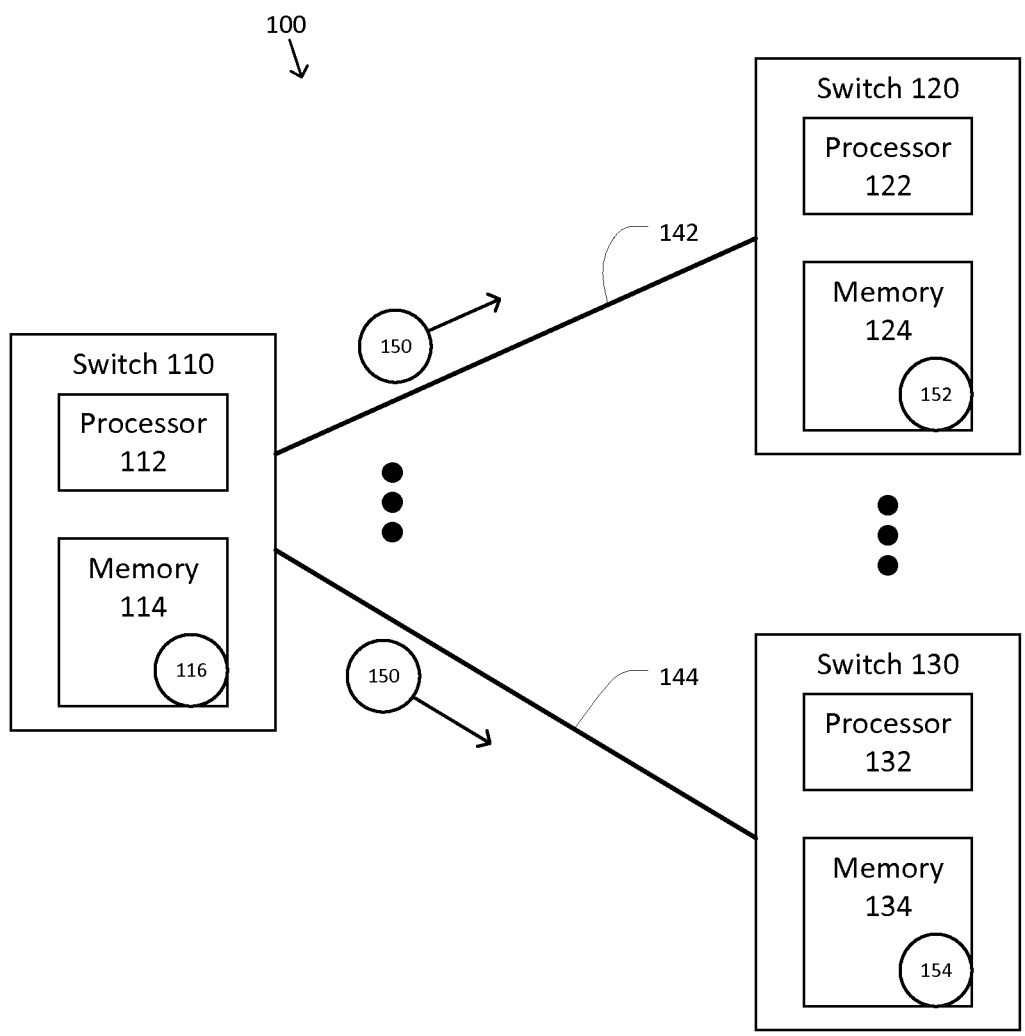
FIG. 1 shows a simplified diagram of a network supporting storage and retrieval of neighboring switch tokens according to some embodiments.

FIG. 1 shows a simplified diagram of a network 100 supporting storage and retrieval of neighboring switch tokens according to some embodiments. As shown in FIG. 1, the network 100 includes a first network switching unit or switch 110. Included in the switch 110 are one or more processors 112 and memory 114. As shown in FIG. 1, the memory 114 includes storage for a token 116. In some examples, the token 116 may include one or more pieces of information related to the configuration and/or operation of the switch 110. Network 100 also includes a second switch 120 including one or more processors 122 and memory 124. Network 100 may also include additional switches such as a third switch 130 which includes one or more processors 132 and memory 134. In some examples, the memory 114, the memory 124, and/or the memory 134 may include one or more different kinds of machine readable media. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. In some examples, the memory 114, the memory 124, and/or the memory 134 may include both non-volatile and volatile storage media.

The switches in the network 100 may also be coupled together. As shown in FIG. 1, switches 110 and 120 are coupled together using a first network link 142 between respective ports of the switches 110 and 120, and switches 110 and 130 are coupled together using a second network link 144 between respective ports of the switches 110 and 130. Network 100 may additionally include other network links coupling the switches 110, 120, and/or 130 with the additional switches in the network 100. According to some embodiments, the switches 120 and/or 130 may be used by the switch 110 to store copies of all or part of the token 116. In some examples, the switch 110 may broadcast a token storage request 150 to neighboring switches (e.g., the switches 120 and/or 130) including a copy of all or part of the token 116. When switch 120 receives the token storage request 150, switch 120 may store a copy 152 of the token 116 in the memory 124. When switch 130 receives the token storage request 150, switch 130 may store a copy 154 of the token 116 in the memory 134.

Figure 2:
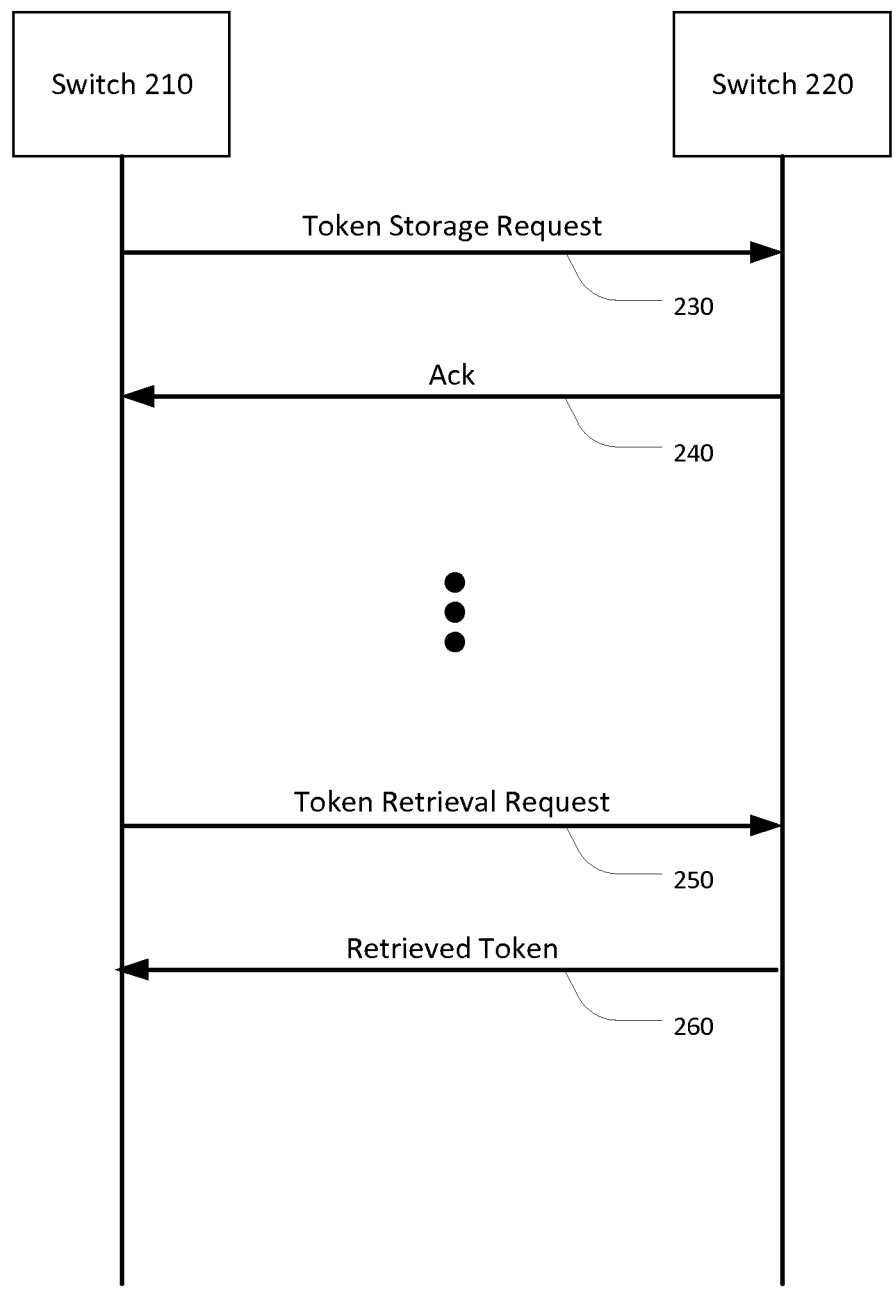
FIG. 2 shows a simplified diagram of message passing between two switches to store and retrieve a token according to some embodiments.

FIG. 2 shows a simplified diagram of message passing between two switches to store and retrieve a token according to some embodiments. As shown in FIG. 2, a switch 210 may use a neighboring switch 220 to store and later retrieve a token. In some examples, the switch 210 may be the switch 110 and the switch 220 may be the switch 120 and/or the switch 130. In some examples, the token may be the token 116. Several messages may be passed between switches 210 and 220 related to the token. The several messages include a token storage request 230, an acknowledgment or ack 240, a token retrieval request 250, and a retrieved token message 260.

As shown, switch 210 may send the token storage request 230 to switch 220 to request that switch 220 store a copy of the token. In some examples, the token may include one or more pieces of information related to the configuration and/or operation of the switch 210. The token storage request 230 includes a copy of all or part of the token. Switch 220 may respond back to switch 210 with the ack 240 to confirm that switch 220 has received the token storage request 230 and stored a copy of the included token. In some examples, switch 220 may store the copy of the token in memory. In some examples, the memory may be non-volatile. In some examples, the memory may be volatile. Because the switch 220 may be receiving token storage requests from switches other than switch 210, the switch 220 may index the token using information associated with switch 210. In some examples, the switch 220 may index the token based on a port on which the token storage request 230 is received. In some examples, the switch 220 may index the token based on a source address, e.g., a MAC address of the switch 210, included in the token storage request 230. In some examples, the switch 220 may index the token based on a switch identifier included in the token storage request 230.

At a later time, switch 210 may retrieve the copy of the token from switch 220. Switch 210 may send the token retrieval request 250 to switch 220 to request the copy of the token. If switch 220 is storing a copy of the token identified in the token retrieval request 250, switch 220 may return a copy of the token by sending the retrieved token message 260. In some examples, the switch 220 may identify the token to retrieve based on a port on which the token retrieval request 250 is received. In some examples, the switch 220 may identify the token to retrieve based on a source address, e.g., a MAC address of the switch 210, included in the token retrieval request 250. In some examples, the switch 220 may identify the token to retrieve based on a switch identifier included in the token retrieval request 250.

According to some embodiments, the message passing of FIG. 2 may be implemented using the Link Layer Discovery Protocol (LLDP). The LLDP is typically used by network switching units (e.g., the switches 210 and/or 220) to share identification, configuration, and capability information. Each LLDP frame includes an LLDP data unit (LLDPDU) containing a type-length-value (TLV) structure. Because LLDP supports custom TLVs, different custom TLVs may be used for the token storage request 230, the token retrieval request 250, and the retrieved token 260 messages.

In some examples, a first custom TLV may include a first subtype indicating that the first custom TLV is a token storage request 230 including a value field that includes a token identifier and/or a value for a token. Switch 210 may send an LLDP frame including the first custom TLV to switch 220 to ask switch 220 to store a copy of a token. In some examples, a second custom TLV may include a second subtype indicating that the second custom TLV is a token retrieval request 250 including a value field that may optionally include a token identifier. Switch 210 may send an LLDP frame including the second custom TLV to switch 220 to ask switch 220 for a copy of a previously stored token. In some examples, a third custom TLV may include a third subtype indicating that the third custom TLV is a retrieved token 260 including a value field that includes a token identifier and/or a value for a token. Switch 220 may send an LLDP frame including the third custom TLV to switch 210 to return a retrieved copy of the requested token back to switch 210.

As discussed above and further emphasized here, FIG. 2 is merely an example, which should not unduly limit the scope of the claims. One of ordinary skill in the art would recognize many variations, alternatives, and modifications. According to some embodiments, switch 210 may send more than one token storage request 230, each of the token storage requests may include information associated with different tokens. In some examples, the token storage request 230 may include a token identifier that the switch 220 may use to further index each of the different tokens. In some examples, the token storage request 230 may include information associated with multiple tokens. According to some embodiments, the switch 210 may update the copy of the token by sending a second token storage request 230 to the switch 220 including updated token information.

According to some embodiments, the token storage request 230 and/or the token retrieval request 250 may be broadcast to more than one switch. In some examples, the token may be stored in each of the switches that receive the token storage request 230 as shown by the token copies 152 and 154 in FIG. 1. In some examples, the switch 210 may receive the retrieved token message 260 from each of the switches that received the token retrieval request 250. In some examples, switch 210 may compare the token in each of the retrieved token messages 260 to validate the value of the retrieved token.

According to some embodiments, switch 210 may improve security of the token by only sending it to trusted neighboring switches. In some examples, the token storage request 230 may be broadcast only to trusted neighboring switches. In some examples, the token retrieval request 250 may be broadcast only to trusted neighboring switches. In some examples, the token storage request 230 and/or the token retrieval request 250 may only be broadcast on ports designated as trusted. In some examples, the trusted neighboring switches may only include core and/or aggregation switches in a network.

Figure 3:
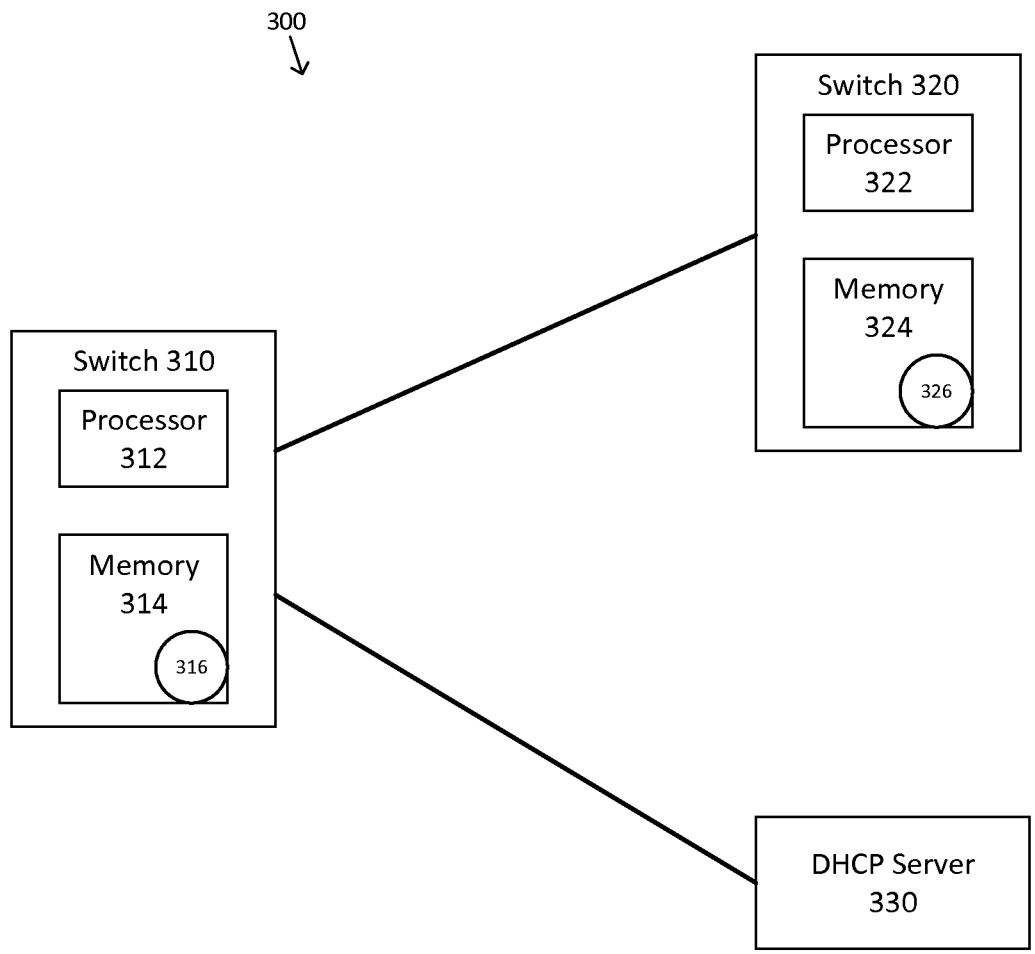
FIG. 3 shows a simplified diagram of a network using storage and retrieval of neighboring switch tokens to support the Dynamic Host Configuration Protocol according to some embodiments.

FIG. 3 shows a simplified diagram of a network 300 using storage and retrieval of neighboring switch tokens to support the Dynamic Host Configuration Protocol according to some embodiments. As shown in FIG. 3, the network 300 includes a switch 310 coupled to a neighboring switch 320. The switch 310 includes one or more processors 312 and memory 314. In some examples, the switch 310 may be the switch 110 and/or the switch 210. Stored in the memory 314 is a token 316. The switch 320 includes one or more processors 322 and memory 324. In some examples, the switch 320 may be the switch 120, the switch 130, and/or the switch 220. Stored in the memory 324 is a copy 326 of the token 316. In some examples, the token copy 326 may be stored and/or retrieved using the message passing of FIG. 2. The network 300 also includes a Dynamic Host Configuration Protocol (DHCP) server 330 coupled to the switch 310.

A DHCP server, such as the DHCP server 330, is typically used to provide configuration and/or provisioning information to switches in a network. A switch, such as the switch 310, may broadcast a DHCP DISCOVER request to neighboring devices requesting configuration and/or provisioning information. The DHCP DISCOVER request typically includes information to identify the requesting switch such as a hardware address or a MAC address. Based on the identity of the requesting switch, the DHCP server typically returns a DHCP OFFER including information such as an IP address and other configuration and/or provisioning information. In some examples, the configuration and/or provisioning information provided in the DHCP OFFER is typically set-up, at least in part, manually by an operator of a network. In some examples, when a switch is replaced (e.g., due to a failure) in a network the operator may need to manually update the DHCP server because a replacement switch will not generally have the same hardware address as the replaced switch. Thus, it would be advantageous to avoid having to manually update the DHCP server after switch replacement.

Figure 4:
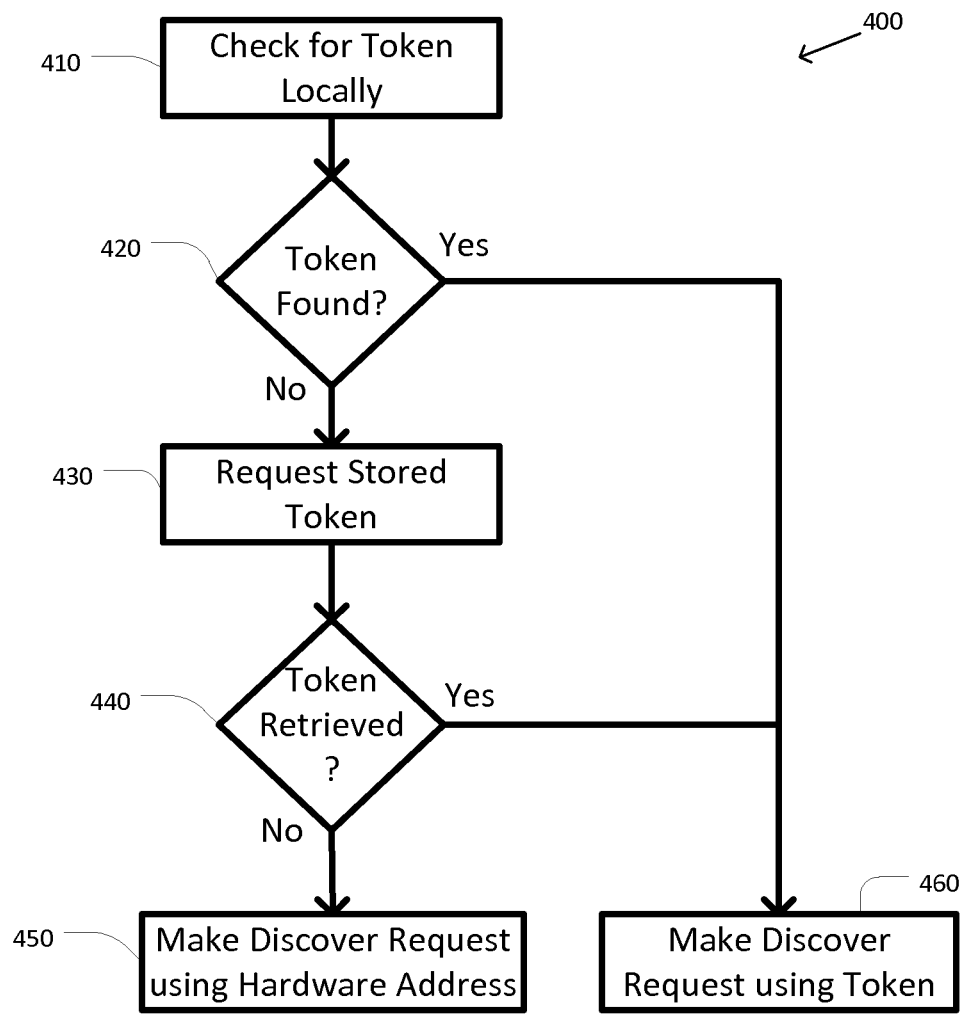
FIG. 4 shows a simplified diagram of a method of provisioning a switch using a token according to some embodiments.

FIG. 4 shows a simplified diagram of a method 400 of provisioning a switch using a token according to some embodiments. As shown in FIG. 4, the method 400 includes a process 410 for checking for a token locally, a process 420 for determining whether the token is found, a process 430 for requesting a stored token, a process 440 for determining whether the token is retrieved, a process 450 for making a discover request using a hardware address, and a process 460 for making a discover request using the token. According to certain embodiments, the method 400 of provisioning a switch using a token can be performed using variations among the processes 410-460 as would be recognized by one of ordinary skill in the art. In some embodiments, one or more of the processes 410-460 of method 400 may be implemented, at least in part, in the form of executable code stored on non-transient, tangible, machine readable media that when run by one or more processors (e.g., the one or more processors 312 and/or 314 and/or one or more processors in the DHCP server 330) may cause the one or more processors to perform one or more of the processes 410-460.

At the process 410, a switch (e.g., the switch 310) checks locally for a token. In some examples, the switch may check for the token in its memory (e.g., the memory 314). In some examples, the switch may check for the token in volatile memory. In some examples, the switch may check for the token in non-volatile memory. In some examples, the token includes a switch identifier (e.g., a client identifier and/or a system identifier). In some examples, the switch identifier may be used to identify the switch based on its position and/or role in a network rather than by a hardware identifier or address (e.g., a MAC address) that identifies a particular switch. Thus, the switch identifier may be independent of the particular switch installed. In some examples, the switch identifier may be provided to the switch by an operator. In some examples, the switch identifier may be provided by the DHCP server in response to a prior DHCP DISCOVER request.

At the process 420, the switch determines whether the token is found. When the token is found locally during the process 410, the switch already knows its hardware-independent client identifier and may use the client identifier to make a discover request in the process 460. When the token is not found locally during the process 410, the switch may still be able to discover its client identifier by requesting it from a neighboring switch in the process 430. In some examples, the switch may not be able to find the token locally during the process 410 because it is a replacement switch.

At the process 430, the switch requests the stored token. In some examples, the switch may broadcast a token retrieval request (e.g., the token retrieval request 250) to one or more of its neighboring switches. In some examples, the token retrieval request may request the token including the switch identifier.

At the process 440, the switch determines whether the token is retrieved. In some examples, one or more of the neighboring switches (e.g., the switch 320) may retrieve and return the token to the switch using a retrieved token message (e.g., the retrieved token message 260). In some examples, each of the one or more neighboring switches may return the requested token if it had previously received the token in a token storage request (e.g., the token storage request 230). In some examples, each of the one or more neighboring switches may retrieve the token from its memory (e.g., the memory 324). In some examples, when the switch is a replacement switch, the replaced switch may have sent the previous token storage request and thus the replacement switch is able to learn its switch identifier automatically. When the token is retrieved during the process 430, the switch may use the included hardware-independent client identifier to make a discover request in the process 460. When the token is not retrieved, the switch may make a discover request using a hardware address in the process 450.

At the process 450, the switch makes a discover request using a hardware address. In some examples, the switch may make the discover request using a MAC address for the switch. In some examples, the switch may send a DHCP DISCOVER request to a DHCP server (e.g., the DHCP server 330). The DHCP DISCOVER request may include the hardware address, and the DHCP server may respond with a DHCP OFFER based on the included hardware address. In some embodiments, the DHCP OFFER may include the location of a configuration and/or provisioning file for the switch.

At the process 460, the switch makes a discover request using the token. In some examples, the switch may make the discover request using the switch identifier included in the token. In some examples, the switch may send a DHCP DISCOVER request to a DHCP server (e.g., the DHCP server 330) and the DHCP server may respond with a DHCP OFFER based on the provided switch identifier. Thus, the DHCP server may provide correct configuration and/or provisioning information to a replacement switch even though the replacement switch may have a different hardware address than a replaced switch. In some embodiments, the DHCP DISCOVER request may also include the hardware address, and the DHCP server may associate the hardware address with the switch identifier.

Figure 5:
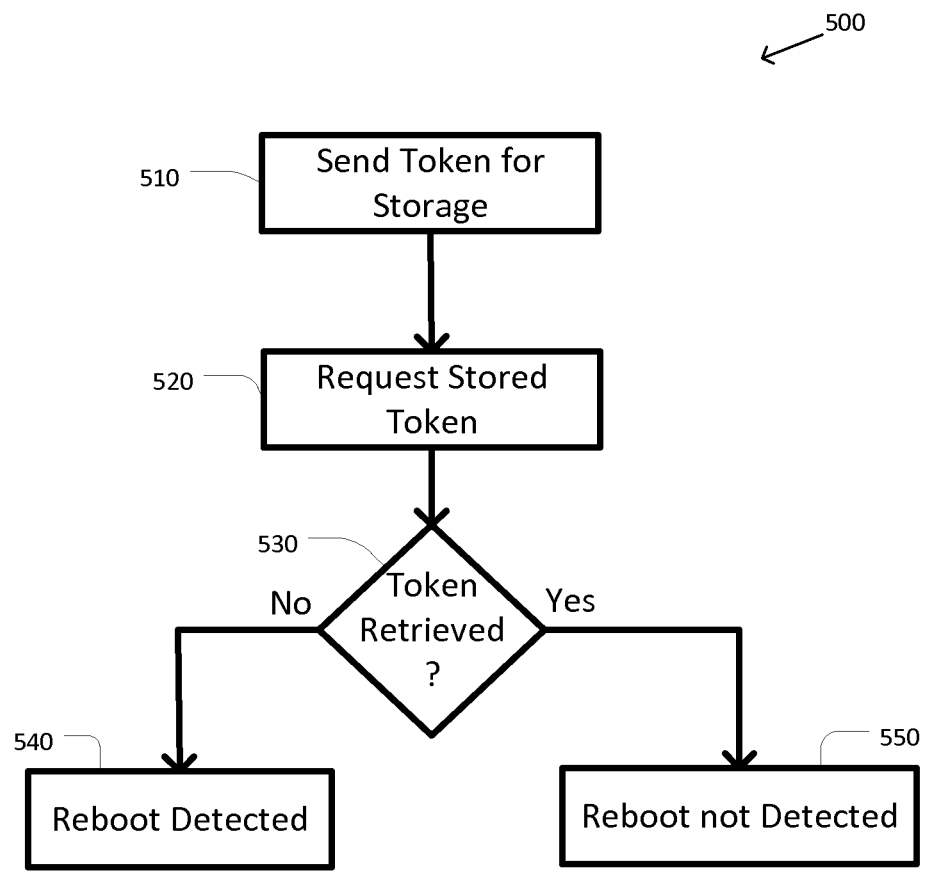
FIG. 5 shows a simplified diagram of a method of switch reboot detection using a token according to some embodiments.

FIG. 5 shows a simplified diagram of a method 500 of switch reboot detection using a token according to some embodiments. As shown in FIG. 5, the method 500 includes a process 510 for sending a token for storage, a process 520 for requesting the stored token, a process 530 for determining whether the token is retrieved, a process 540 for detecting a reboot, and a process for not detecting a reboot. According to certain embodiments, the method 500 of switch reboot detection using a token can be performed using variations among the processes 510-550 as would be recognized by one of ordinary skill in the art. In some embodiments, one or more of the processes 510-550 of method 500 may be implemented, at least in part, in the form of executable code stored on non-transitory, tangible, machine readable media that when run by one or more processors (e.g., the one or more processors 112, 122, 132, 312 and/or 314) may cause the one or more processors to perform one or more of the processes 510-550.

According to some embodiments, the method 500 of switch reboot detection using a token may be useful during switch upgrading and/or reconfiguration. In some examples, when a first switch is part of peer group with a second switch and the first and second switch form a virtual LAN trunk (VLT), it may be helpful for the first switch to know whether the second switch has rebooted while the first switch is rebooting. Because the first and second switch are in a peer group, the second switch may take over network traffic forwarding for the first switch while the first switch is being reconfigured and reboots. If the second switch remains up and functioning while the first switch is being reconfigured, it is possible for the first switch to smoothly reassume network traffic forwarding responsibilities when the first switch is done being reconfigured. If, however, the second switch reboots while the first switch is being configured, the first switch and the second switch may need to perform different configuration steps before the first and second switches can again begin functioning as a peer group. Accordingly, it would be advantageous for the first switch to know if the second switch has been rebooted.

At the process 510, a first switch sends a token for storage in a second switch. In some examples, the first switch may be the switch 110, 210, and/or 310 and the second switch may be the switch 120, 130, 220, and/or 320. In some examples, the first switch may send the token to the second switch using a token storage request (e.g., the token storage request 230). In some examples, the first switch may send the token storage request before it begins a reconfiguration process and/or reboots itself. In some examples, when the token storage request is received by the second switch, the second switch may store it in its volatile memory (e.g., the memory 114, 124, and/or 324).

At the process 520, the first switch requests the stored token. In some examples, the first switch may send a token retrieval request (e.g., the token retrieval request 250) to the second switch. In some examples, the token retrieval request may request the token stored during the process 510. In some examples, the process 520 occurs after the first switch has completed additional portion of the reconfiguration process and/or rebooted itself.

At the process 530, the first switch determines whether the token is retrieved. In some examples, the second switch may retrieve and return the token to the first switch using a retrieved token message (e.g., the retrieved token message 260). In some examples, the second switch may retrieve the token stored during the process 510. In some examples, if the second switch has been rebooted since the process 510 stored the token, the token has been erased from the volatile memory and cannot be retrieved by the second switch.

When the first switch determines that the token is not retrieved, the first switch may, during the process 540, detect that the second switch has rebooted.

When the first switch determines that the token is retrieved, the first switch may, during the process 550, detect that the second switch has not rebooted.

Some embodiments of switches 110, 120, 130, 210, 220, 310, and 320, and the DHCP server 330 may include non-transient, tangible, machine readable media that include executable code that when run by one or more processors may cause the one or more processors to perform the message passing of FIG. 2 and/or the processes of methods 400 and/or 500 as described above. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A switch comprising:
one or more processors;
memory configured for storing a first token, the first token including a first hardware-independent identifier associated with the switch; and
a first port configured to couple the switch to a second switch;
wherein the one or more processors are configured to:
send a first token storage request to the second switch, the first token storage request including the first hardware-independent identifier;
check for the first token in the memory;
when the first token is not found in the memory:
send a first token retrieval request to the second switch requesting the first hardware-independent identifier; and
receive a first retrieved token message from the second switch, the first retrieved token message including the first hardware-independent identifier;
make a discovery request using the first hardware-independent identifier.

2. The switch of claim 1 wherein the one or more processors are further configured to:
send a second token storage request to the second switch, the second token storage request including information associated with a second token, the second token including a second hardware-independent identifier associated with the switch;
send a second token retrieval request to the second switch requesting the second hardware-independent identifier; and
receive a second retrieved token message from the second switch, the second retrieved token message including the second token second hardware-independent identifier.

3. The switch of claim 1, further comprising:
a second port configured to couple the switch to a third switch;
wherein the one or more processors are further configured to:
send a second token storage request to the third switch, the second token storage request including the first hardware-independent identifier;
send a second token retrieval request to the third switch requesting the first hardware-independent identifier; and
receive a second retrieved token message from the third switch, the second retrieved token message including the first hardware-independent identifier.

4. The switch of claim 3 wherein the one or more processors are further configured to validate the first hardware-independent identifier by comparing the first and second retrieved token messages.

5. The switch of claim 1 wherein the first port is a trusted port.

6. The switch of claim 1, further comprising:
a second port configured to couple the switch to a third switch;
wherein the one or more processors are further configured to:
receive a second token storage request from the third switch, the second token storage request including information associated with a second token;
store the information associated with the second token in the memory;
receive a second token retrieval request from the third switch requesting the information associated with the second token; and
send a second retrieved token message to the third switch, the second retrieved token message including the information associated with the second token.

7. The switch of claim 6 wherein:
the first port and the second port are the same; and
the second switch and the third switch are the same.

8. The switch of claim 1 wherein the first token storage request, the first token retrieval request, and the retrieved token message are Link Layer Discovery Protocol (LLDP) messages.

9. The switch of claim 1, wherein the first token storage request further includes a first token identifier.

10. The switch of claim 9, wherein the first token retrieval request includes the first token identifier.

11. The switch of claim 9, wherein the first token identifier includes information associated with the first port.

12. The switch of claim 9, wherein the first token identifier includes a media access control (MAC) address of the switch.

13. A switch comprising:
one or more processors;
memory; and
a first port configured to couple the switch to a second switch;
wherein the one or more processors are configured to:

receive a first token storage request from the second switch, the first token storage request including a first token and a first token identifier associated with the first token, the first token including a first hardware-independent identifier associated with the second switch;

store the first hardware-independent identifier in the memory, wherein the first hardware-independent identifier is indexed based on the first token identifier;

receive a first token retrieval request from the second switch requesting the first hardware-independent indentifier, the first token retrieval request including the first token identifier; and send a first retrieved token message to the second switch, the first retrieved token message including the first hardware-independent identifier;

wherein the first hardware-independent identifier included in the first retrieved token message is used by the second switch to make a discovery request.

14. The switch of claim 13 wherein the first hardware-independent identifier is indexed based on information associated with the first port.

15. The switch of claim 13 wherein the first hardware-independent identifier is indexed based on information associated with a media access control (MAC) address of the first switch.

16. The switch of claim 13 wherein the one or more processors are further configured to:

receive a second token storage request from the second switch, the second token storage request including a second hardware-independent identifier associated with a second token identifier;

store the second hardware-independent identifier in the memory;

index the second hardware-independent identifier based on the second token identifier;

receive a second token retrieval request from the second switch requesting the second hardware-independent identifier, the second token retrieval request including the second token identifier; and send a second retrieved token message to the second switch, the second retrieved token message including the second hardware-independent identifier.

17. The switch of claim 13, further comprising:

a second port configured to couple the switch to a third switch;

wherein the one or more processors are further configured to:

receive a second token storage request from the third switch, the second token storage request including a second hardware-independent identifier;

store the second hardware-independent identifier in the memory;

index the second hardware-independent identifier based on information associated with the third switch;

receive a second token retrieval request from the third switch requesting the second hardware-independent identifier; and send a second retrieved token message to the third switch, the second retrieved token message including the second hardware-independent identifier.

18. The switch of claim 13 wherein the memory includes volatile memory.

19. The switch of claim 13 wherein the memory includes non-volatile memory.

20. An information handling system comprising:

a first switch comprising:
one or more first processors;
a first memory configured for storing a token, the token including a hardware-independent identifier associated with the first switch; and
a first port;

a second switch comprising:
one or more second processors;
a second memory; and
a second port; and a network link coupling the first port to the second port;

wherein the one or more first processors are configured to:
send a token storage request to the second switch, the token storage request including the hardware-independent identifier;
check for first token in the memory;
when the first token is not found in the memory:
send a token retrieval request to the second switch requesting the hardware-independent identifier;
receive a retrieved token message from the second switch, the retrieved token message including the hardware-independent identifier; and
make a discovery request using the hardware-independent identifier;

wherein the one or more second processors are configured to:
receive the token storage request from the first switch;
store the information associated with the token in the second memory;
receive the token retrieval request from the first switch; and
send the retrieved token message to the first switch.

* * * * *